United States Patent

[11] 3,577,641

[72] Inventor Leedice Solomon Smith
  Rte. 1, Box 132, Elk, Wash. 99009
[21] Appl. No. 854,953
[22] Filed Sept. 3, 1969
[45] Patented May 4, 1971

[54] COMBINATION TAPE MEASURE AND COMPASS
  9 Claims, 13 Drawing Figs.
[52] U.S. Cl.............................................. 33/27, 33/138
[51] Int. Cl.............................................. B43l 9/04
[50] Field of Search.................................... 33/27 (A), (B), (C), 137, 138

[56] References Cited
UNITED STATES PATENTS
2,400,343  5/1946  Eskil........................... 33/27
2,582,488  1/1952  Kroenlein...................... 33/27
2,906,024  9/1959  Smith........................... 33/27
3,120,059  2/1964  Quenot......................... 33/27

Primary Examiner—Leonard Forman
Assistant Examiner—Charles E. Phillips
Attorney—Wells & St. John ABSTRACT: A coiled measuring tape is mounted within a case having an inner recess. A releasable locking clamp is located within the case recess for selectively fixing the tape relative to the case. It is operated by an external movable member that extends within the case for manually locking the tape and simultaneously causing a compass point fixed to it to protrude beyond the case. By use of the compass point, a circle can be scribed at the outer end of the tape. When released, the device permits the tape to be used for measuring purposes in the normal fashion.

PATENTED MAY 4 1971
3,577,641
SHEET 1 OF 4
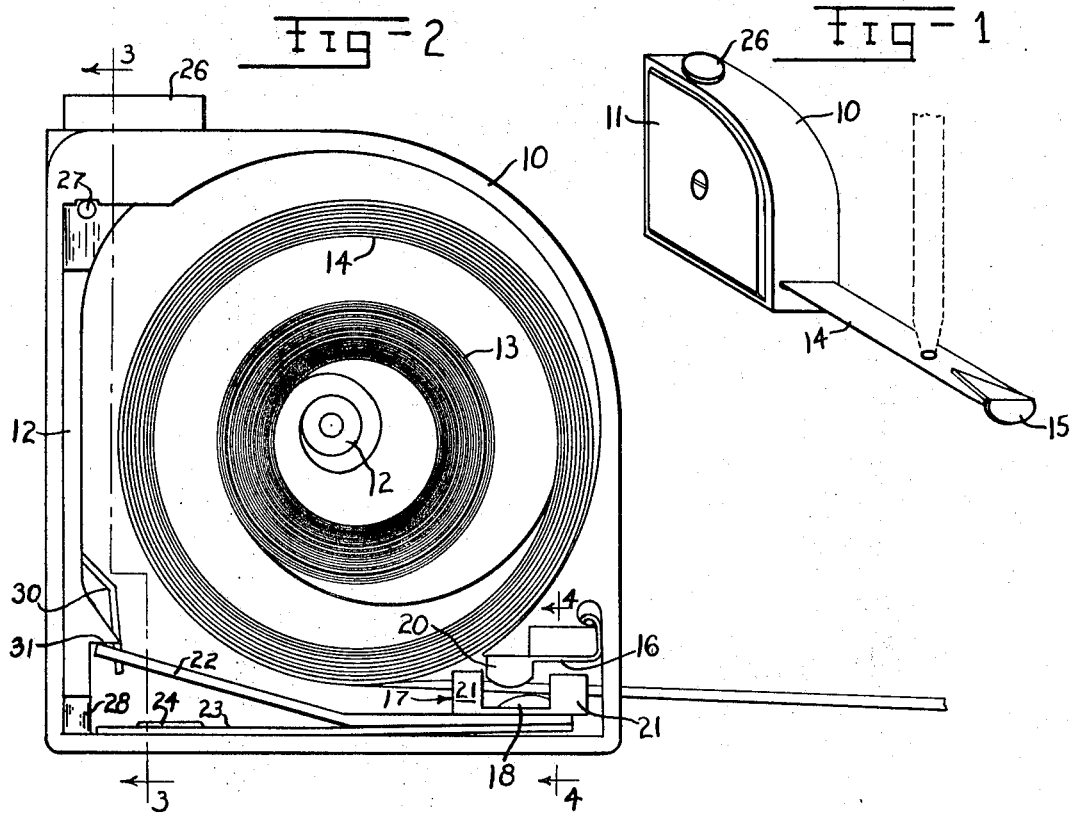
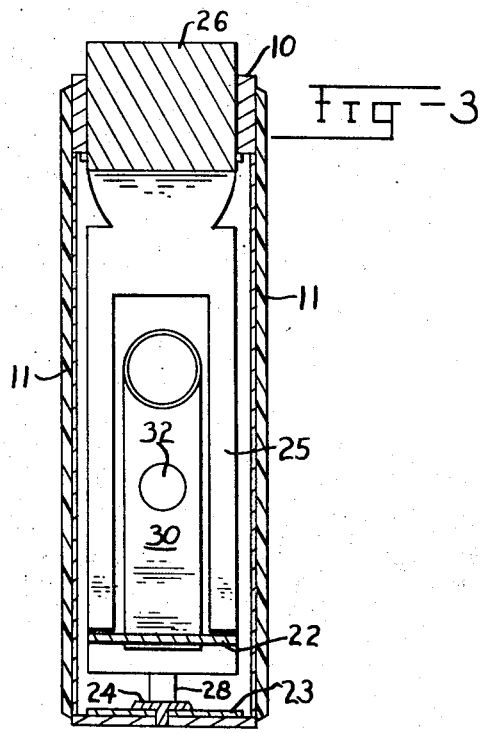
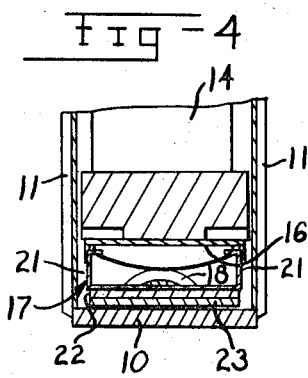
INVENTOR.
Leedice Solomon Smith
BY
*Wills & St. John*
Attys

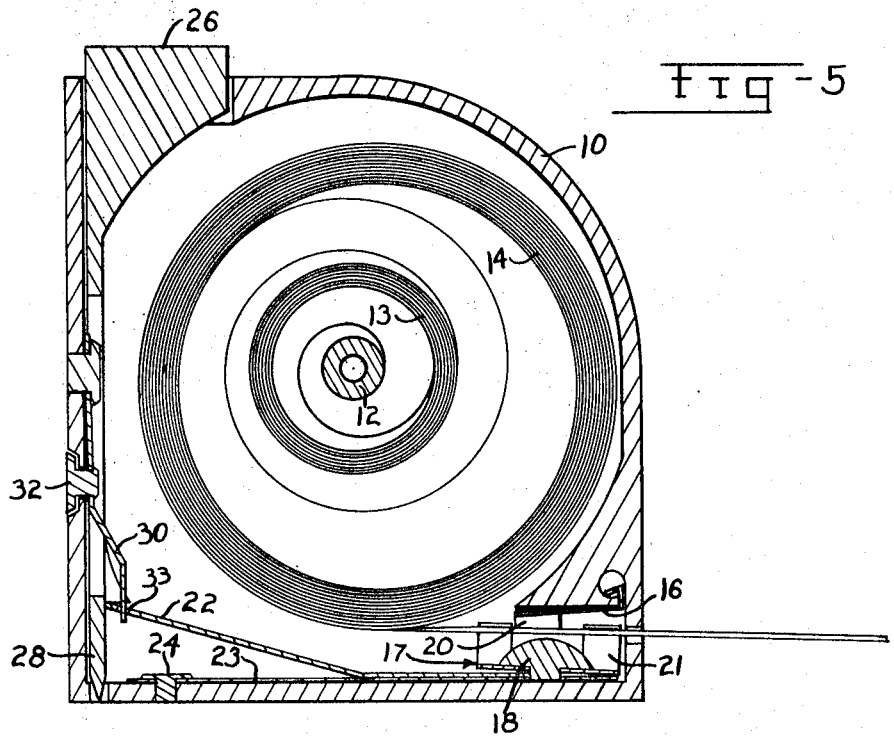
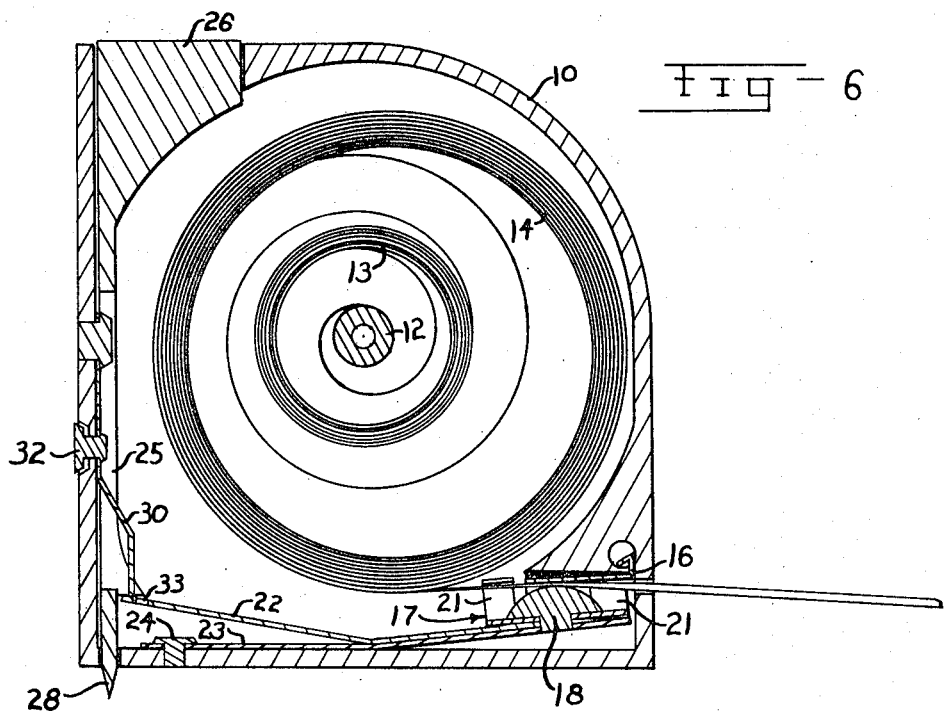

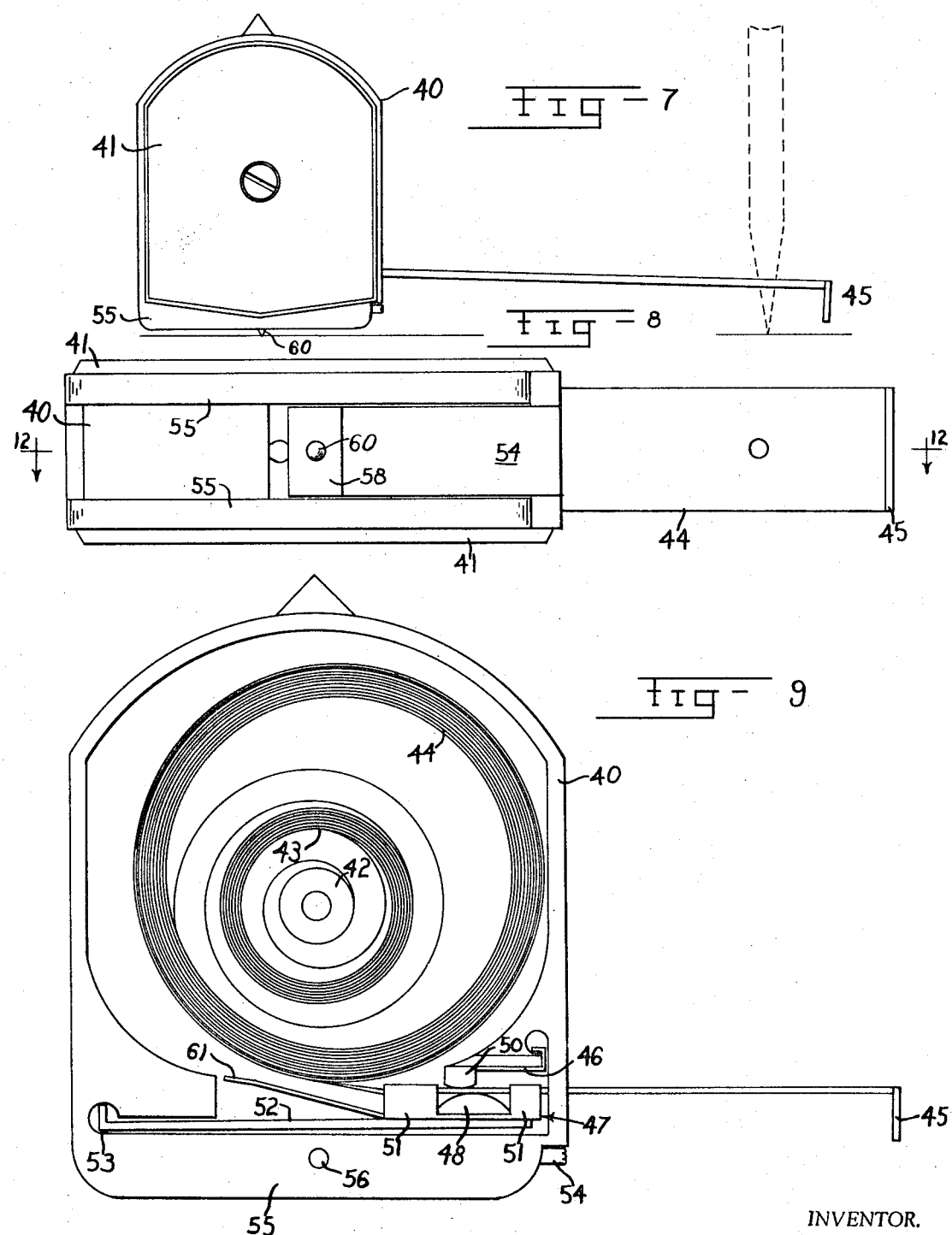

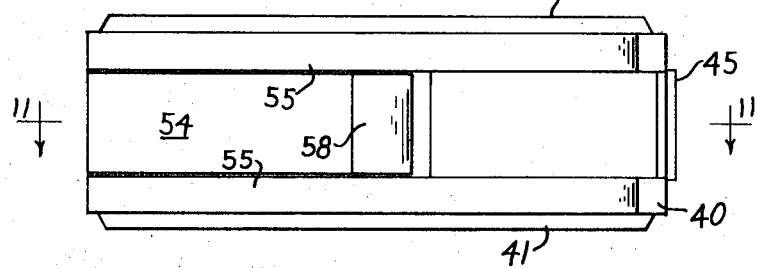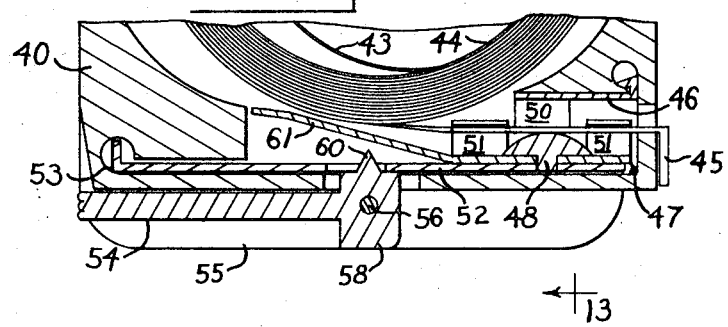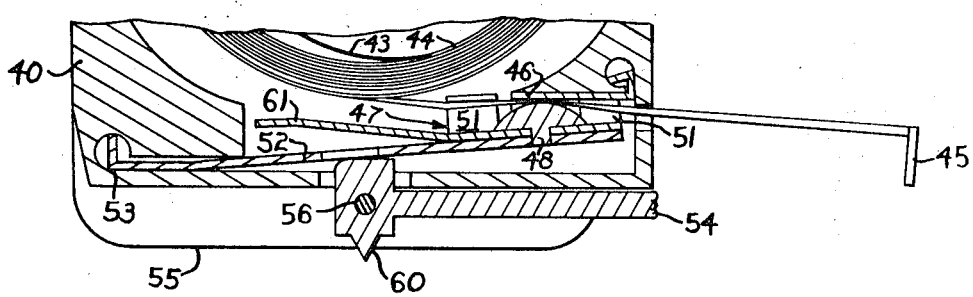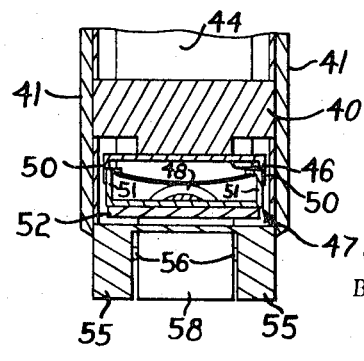

3,577,641

COMBINATION TAPE MEASURE AND COMPASS

BACKGROUND OF THE INVENTION

This development relates specifically to an instrument for outlining or drawing circles having a relatively great radius. It is designed to serve a double purpose as a conventional tape measure or as a compass. The present improvement is designed to not impair the use of the apparatus for normal measurement purposes. The apparatus includes a selectively engageable lock for the tape, usable for normal measuring purposes as well as for the marking of circles. When the lock is engaged, a point normally recessed within the outside boundaries of the case protrudes outwardly from the case.

Various devices have previously been shown in U.S. patents to permit utilization of a tape measure for the drawing of circles. These are illustrated in the U.S. Pats. to Quenot, No. 3,120,059; Smith, No. 2,906,024; Kultner, No. 2,804,688; Moxey, No. 2,349,670; and Metcalf, No. 2,065,143. Each of these patents includes the use of a device protruding beyond the normal configuration of the case for a tape measure. Such devices are subject to accidental damage, which would greatly decrease their accuracy for measuring purposes. They each add a more complicated mechanism to the tape measure and make the apparatus more vulnerable to damage under normal working conditions. A tape measure is normally subject to rather difficult working conditions and even abuse. It is sometimes dropped accidentally and often impacted by other tools or articles. To minimize the risk of such damage, the present apparatus comprises a combined lock and compass point arrangement which essentially is located within the normal confines of the tape measure case, where it is protected from accidental damage. It thereby retains the accuracy of the tape for all purposes, including the measuring of a radius of a circle drawn thereby.

SUMMARY OF THE INVENTION

Invention lies in the combination of a measuring tape assembly including a recessed case and a coiled measuring tape extending outwardly through a slot in the case with the addition of the improvement comprising a locking arrangement or clamp movably mounted to the case within the recess for selectively engaging the tape plus a compass point fixed to the manually movable locking apparatus. The point is arranged so as to be projected outward of the case perpendicular to the tape when the locking element is in its locked position and so as to be recessed within the outer case boundaries when the movable element is in its released position.

It is one object of this invention to provide a locking apparatus and compass point for a tape measure wherein this additional structure is capable of withstanding the normal pressures and forces encountered in construction usage.

Another object of the invention is to provide a compact tape measure having the additional features of a locking arrangement and compass point.

Another object of this invention is to provide in a tape measure a compass point arrangement which does not detract from the normal use made of the tape measure.

These and further objects will be evident from the following description of the apparatus and the accompanying drawings. It is to be understood that mechanical equivalents might be substituted for the specific elements illustrated, while still attaining the above objects.

DESCRIPTION OF THE DRAWINGS

FIG. 1 is a perspective view of a first embodiment of the invention showing its use in the drawing of a circle;

FIG. 2 is an enlarged side elevation view of the first embodiment with the sideplate thereof removed;

FIG. 3 is an enlarged fragmentary sectional view taken along line 3–3 in FIG. 2;

FIG. 4 is an enlarged fragmentary sectional view taken along line 4–4 in FIG. 2;

FIG. 5 is a vertical cross section through the first embodiment while in its unlocked condition;

FIG. 6 is a view similar to FIG. 3 showing the apparatus in locked condition;

FIG. 7 is a side elevation view of a second embodiment of the invention shown in operation during the drawing of a circle;

FIG. 8 is an enlarged bottom view of the apparatus shown in FIG. 7;

FIG. 9 is an enlarged side view of the embodiment shown in FIG. 7 with the side cover plate removed;

FIG. 10 is an enlarged bottom view of the apparatus in FIG. 7 when unlocked and with the tape retracted;

FIG. 11 is a partial vertical sectional view taken along line 11–11 in FIG. 10;

FIG. 12 is a partial vertical sectional view taken along line 12–12 in FIG. 8; and FIG. 13 is an enlarged fragmentary cross-sectional view taken along line 13–13 in FIG. 11.

DESCRIPTION OF THE PREFERRED EMBODIMENT

The essential combination of elements common to both embodiments described specifically herein relates to a unitary tape measure case having a generally rectangular configuration with one or more rounded corners fitting about the coiled tape mechanism mounted within its recess or cavity. The case is slotted at one side to receive a tangential extension of the coiled tape, which can be moved in or out relative to the case through the slot for measuring purposes. The case mounts a locking mechanism that extends within the recess for selectively clamping the tape relative to the case to fix its position. The locking mechanism includes an integral point which is moved from a recessed position within the case boundaries to a condition in which it selectively protrudes outward from the case perpendicular to the tape when the tape is locked.

FIRST EMBODIMENT

The first embodiment of the invention is illustrated in FIGS. 1—6. In this arrangement, the recessed case within which the measuring apparatus is housed comprises a main body 10 and a removable side cover panel 11. With the panel 11 secured to the body 10, the case presents a pair of spaced panels spanned by sidewalls which together define an open interior recess. A center post 12 fixed to the case body 10 serves to anchor the panel 11 to the body 10. It also anchors the spring and tape mechanism and defines the general central axis for the spirally wound tape unit.

The spring 13 is coiled length of spring metal having its inner end fixed to the center post 12 and its outer end connected to the inner end of a similarly wound measuring tape 14. The tape 14 is wound within the case in the usual fashion and includes an outer hook 15 used for measuring purposes. The outer end of the tape 14 is movably received through a transverse slot in the front wall of the case as a tangential extension of the wound tape within the case recess. The tape 14 has one or both surfaces graduated and arranged visually for measurement purposes. Conventional measurements normally are calibrated from the outer end of tape 14.

Mounted within the case recess adjacent to the slot through which the tape protrudes is a clamp mechanism best seen in FIGS. 4, 5 and 6. This includes an upper stationary ledge 16 having downwardly extending guides 20 at each side, the tape 14 being normally received between the guides 20. It also includes a movable clamp 17 having an upwardly protruding center button 18 adapted to engage the normally convex lower surface of the tape 14 to lock the tape against the ledge 16. Guides 21 at each side of clamp 17 fit over the tape upper surface to insure proper positioning of the clamp relative to the extended tape section. In FIG. 5 the clamp 17 is in a lower or released condition. In FIG. 6 it is shown in its raised or locked condition.

The movable clamp 17 is fixed to one end of a centrally bent support lever 22 that extends along one sidewall of the case body 10. The central portion of lever 22 is transversely bent and its lower surface serves as a pivot for causing movement of clamp 17 toward or away from ledge 16. Lever 22 is biased to its released condition by a flat spring 23 located between lever 22 and the sidewall of the case body 10. Spring 23 is fixed to lever 22 immediately adjacent to the clamp 17. Its opposite end is fixed to the case body 10 by a rivet 24.

Lever 22 is manually operated by means of a slide 25 best understood by reference to FIGS. 3, 4 and 6. At one end, slide 25 is enlarged to present a manually engageable button 26 that protrudes slightly beyond the case body 10, which is suitably apertured to permit sliding movement of the button 26. A small pin 27 located within the case recess serves to limit outward movement of button 26 relative to the case body 10 (FIG. 2). At its opposite end, slide 25 is guided within the body 10 by a compass point 28 slidably received through a small aperture in the perpendicular sidewall to which it is selectively extended. The point 28 is movable between a retracted position (FIG. 5) and extended position (FIG. 6) at which it protrudes beyond the boundaries of the case.

Slide 25 engages lever 22 by means of a protruding shoulder 31 formed transversely across the slide 25 at its end adjacent to point 28. The force transmitted through depression of button 26 and subsequent movement of shoulder 31 acts in opposition to the normal biasing force provided by spring 23 and serves to selectively move the clamp 17 toward the ledge 16. At the same time, such movement also results in the point 28 being protruded beyond the case and thereby being available to act as a center for purposes of scribing a circle. After lever 22 is pivoted, it is maintained in its operative position by a spring retainer clip 30 yieldably mounted to the case body 10. Clip 30 has a lower edge that is normally received through an aperture 33 in the lever 22. When the slide 25 is fully depressed, the lower edge of clip 30 is freed from the aperture 33 and rests on the upper surface of lever 22 to maintain lever 22 in a locked condition (FIG. 6). Slide 25 remains free to reciprocate along the case wall. Point 28 is therefore not fixed in its protruding position, but is subject to manual pressure downward on button 26. This pressure serves to hold point 28 on the surface along which a circle is being described, independently of the case itself.

A release button 32 at the outside wall of the case serves to selectively push the clip 30 back into the aperture at 33 and permits lever 22 to return to its unlocked condition.

In use, the outer end of tape 14 is provided with an aperture through which a pencil or scribe can be inserted for drawing of a circle. The tape should be calibrated to read measurements directly at the front wall of the case, taking into account the distance that the point 28 is offset from the front wall and the distance at which the aperture at the outer end of the tape is offset from the end of the tape.

When the drawing of a circle is desired, tape 14 is extended outwardly from the body the desired distance. Button 26 is then depressed to lock the tape in position and also to permit extension of point 28 outwardly from the case, the point 28 can then be used as the center of a compass by depression of button 26 and a pencil or a scribe inserted through the outer tape aperture can be utilized for marking purposes. When not in use for the drawing of circles, tape 14 can be used in normal measuring procedures, and the button 26 serves a double purpose in selectively locking tape 14 for measuring purposes whenever desired.

SECOND EMBODIMENT

The second embodiment of the device is illustrated in FIG. 7—13. Again, the apparatus is located within a case having a body 40 and removable cover panel 41. A center post 42 mounts panel 41 to body 40 and anchors the inner end of a spring 43. The measuring tape is indicated at 44. Its outer end extends tangentially outward from the case through a transverse slot and is provided with an outer hook 45.

The main elements of the clamp mechanism include a ledge 46 formed inwardly adjacent to the slot through which tape 44 protrudes. It is provided with the side guides 50 which overlap the side edges of tape 44. A movable clamp 47 is opposed to ledge 46 and is provided with a protruding central button 48 which selectively engages the convex lower surface of tape 44 and grips the tape 44 against the facing surface of ledge 46. Side guides 51 on the movable clamp 47 also overlap the side edges of the tape 44 to maintain proper positioning of the elements.

The clamp 47 is fixed to the outer end of a spring lever 52, the opposite end of which is bent and anchored at 53. The spring lever 52 normally assumes a straight condition at which the clamp 47 is in an unlocked or released condition (FIG. 11).

The lever 52 is operated by a rigid pivoted lever 54 mounted at the exterior of the case body 40 between protective side shoulders 55 which together form a recessed elongated channel along one sidewall of the body 40 (FIG. 13). Pivotally mounted between the shoulders 55 by means of a transverse pin 56, lever 54 has a transverse cam 58 formed to one side of the axis of pin 56 and a protruding compass point 60 to the opposite side thereof. The cam 58 is operable to move the spring lever 52 between the position shown in FIG. 11 and that shown in FIG. 12 in response to movement of lever 54 from one end of body 40 to the other. Cam 58 directly engages lever 52 through a transverse aperture formed in the sidewall of body 40. This aperture is normally covered by the flat spring lever 52 which prevents entry of foreign material into the case. When the cam 58 is extended outwardly of the center of the case, the point 60 is retracted within the case and freely received through a slot formed through the spring lever 52. A protective plate 61 extends over the retracted point 60 to prevent scratching of tape 44 by engagement against the point 60.

The operation of this form of the invention for normal measuring purposes is identical to that of conventional tape measures. When it is desired to draw a circle, the tape is extended from the base and locked. The upper surface of the tape should be calibrated for direct reading at the front edge of the tape, taking into consideration the offset from the front of the case to the protruding point 60 and the offset from the outer end of the tape 44 to an opening or mount for a pencil or scribe. When the tape 44 is properly extended, the lever 54 is moved from its released position to its locking position, thereby simultaneously clamping tape 44 and causing the point 60 to be extended outwardly beyond the normal boundaries of the protective case. The point 60 then serves as the center of a compass, the circle being indicated or drawn adjacent to the outer end of tape 44. The measure is usable for normal measurement purposes and can be selectively locked whenever desired.

Other forms of the general apparatus may be developed to meet particular requirements of a specific installation. Minor changes in the form or structure of the element are contemplated.

I claim:

1. In combination with a measuring apparatus of the type comprising:
    a case having a pair of spaced panels spanned by sidewalls which together define an interior recess;
    a graduated measuring tape coiled about a transverse axis and located within the case recess;
    said case having a transverse slot formed through said sidewalls through which said tape is moved longitudinally in or out of said case;
    the improvement comprising:
        locking means movably mounted to said case and extending within said case recess for selective engagement of said tape inwardly of said housing slot; said locking means including a manually movable element having at least a portion thereof projecting outward of said case and movable between a locking position to secure said tape in an extended condition and a released position to enable said tape to recoil into said case;

and a compass point fixed to said manually movable element so as to be projected outward of the case in a direction perpendicular to the plane of the tape outward of said case when said movable element is in its locking position and so as to be recessed within the outer boundaries of the case when said movable element is in its released position.

2. The apparatus as set out in claim 1 wherein said locking means further comprises:

a pair opposed members mounted to said case within the interior recess thereof respectively adjacent to opposite surfaces of said tape for clamping relative movement so as to selectively fix the tape relative to said case;

said manually movable element being operatively connected to said members.

3. The apparatus as set out in claim 1 wherein said locking means further comprises:

a pair of opposed members mounted to said case within the interior recess thereof respectively adjacent to opposite surfaces of said tape for clamping relative movement so as to selectively fix the tape relative to said case;

one of said members being fixed to said case and the remaining member being movably mounted for limited movement toward or away from said one member to thereby clamp or release the tape;

said manually movable element being operatively connected to said remaining member.

4. The apparatus as set out in claim 1 wherein said locking means further comprises:

a pair of opposed members mounted to said case within the interior recess thereof respectively adjacent to opposite surfaces of said tape for clamping relative to said case;

one of said members being fixed to said case and the remaining member being movably mounted for limited movement toward or away from said one member to thereby clamp or release the tape;

and spring-biasing means operatively connected between said remaining member and said case for normally urging said remaining member apart from said one member.

5. The apparatus as set out in claim 1 wherein said locking means further comprises:

a pair of opposed members mounted to said case within the interior recess thereof respectively adjacent to opposite surfaces of said tape for clamping relative movement so as to selectively fix the tape relative to said case:

one of said members being fixed to said case and the remaining member being movably mounted for limited movement toward or away from said one member to thereby clamp or release the tape;

and spring-biasing means operatively connected between said remaining member and said case for normally urging said remaining member apart from said one member;

said manually movable element being in the form of a rigid slide movably mounted within the recess of said case along one of the sidewalls thereof, one end of said slide being projected outwardly of said case as a manually engageable operating button and the opposite end of said slide having said compass point fixed thereto;

said slide being operatively connected to said remaining member so as to selectively operate said remaining member in opposition to said spring-biasing means.

6. The apparatus as set out in claim 5 further comprising:

movable means mounted to said casing within the recess thereof for selectively holding said remaining member in clamping condition;

and independently operated means projecting through the case and selectively engageable with said last-named movable means for manual release of said remaining member to release said tape.

7. The apparatus as set out in claim 1 wherein said locking means further comprises:

a pair of opposed members mounted to said case within the interior recess thereof respectively adjacent to opposite surfaces of said tape for clamping relative movement so as to selectively fix the tape relative to said case;

one of said members being fixed to said case and the remaining member being movably mounted for limited movement toward or away from said one member to thereby clamp or release the tape;

and spring-biasing means operatively connected between said remaining member and said case for normally urging said remaining member apart from said one member;

said manually movable element being in the form of a lever pivotally mounted to the exterior of said case about an axis parallel to the central axis of the coiled tape;

said lever having a cam surface to one side of its axis engageable with said remaining member through an opening in the case in communication with the recess so as to selectively operate said remaining member in opposition to said spring-biasing means.

8. The apparatus as set out in claim 7 wherein said compass point is fixed to said lever and projects to one side of its axis in a direction opposite to said cam.

9. A measuring instrument comprising:

a case having a transverse slot formed therethrough;

a graduated measuring tape spirally wound within a recess within the case with the outer end of said tape movably received through said slot;

a wound spring connected between said case and said tape for automatically rewinding said tape;

a locking member movably mounted on said case and operatively connected to said tape at a location within said case, said member being movable between a first position wherein the tape is movable relative to the case and a second position wherein the tape is fixed relative to the case;

and a compass point fixed to said locking member, said compass point being located on said locking member so as to be inwardly clear of the outer boundaries of the case when said member is in its first position and so as to be projected outward beyond the outer boundaries of the case when said member is in its second position.